US 8,810,732 B1

(12) United States Patent
Bozarth et al.

(10) Patent No.: US 8,810,732 B1
(45) Date of Patent: Aug. 19, 2014

(54) AUTO-SELECT ALGORITHM FOR A HIGH-DEFINITION MULTIMEDIA INTERFACE SWITCH

(75) Inventors: Bradley Bozarth, Mountain View, CA (US); Jeffrey D. Boone, Sunnyvale, CA (US); Jon Norenberg, Modesto, CA (US); Jano Banks, Cupertino, CA (US); David C. Buuck, Santa Clara, CA (US); Eric Wiles, Sunnyvale, CA (US)

(73) Assignee: AliphCom, San Francisco, CA (US)

( * ) Notice: Subject to any disclaimer, the term of this patent is extended or adjusted under 35 U.S.C. 154(b) by 1350 days.

(21) Appl. No.: 11/704,552

(22) Filed: Feb. 9, 2007

(51) Int. Cl.
*H04N 5/268* (2006.01)

(52) U.S. Cl.
USPC ........... 348/705; 348/558; 348/555; 348/556; 710/8; 710/10; 710/11; 710/14; 710/16

(58) Field of Classification Search
USPC ........ 710/8, 10, 11, 14, 15, 16; 725/127, 151; 348/705, 706, 572, 552, 554
See application file for complete search history.

(56) References Cited

U.S. PATENT DOCUMENTS

| | | | | |
|---|---|---|---|---|
| 5,671,400 | A * | 9/1997 | Kiggens et al. | 703/23 |
| 7,729,618 | B2 * | 6/2010 | Tatum et al. | 398/139 |
| 8,072,549 | B2 * | 12/2011 | Inoue et al. | 348/723 |
| 2004/0143847 | A1 * | 7/2004 | Suzuki et al. | 725/61 |
| 2006/0001777 | A1 * | 1/2006 | Araki | 348/706 |
| 2006/0077778 | A1 * | 4/2006 | Tatum et al. | 369/44.11 |
| 2006/0114248 | A1 * | 6/2006 | Lee et al. | 345/204 |
| 2006/0125832 | A1 * | 6/2006 | Mawatari et al. | 345/501 |
| 2006/0143679 | A1 * | 6/2006 | Yamada et al. | 725/131 |
| 2006/0209892 | A1 * | 9/2006 | MacMullan et al. | 370/468 |
| 2006/0227970 | A1 * | 10/2006 | Nakano | 380/217 |
| 2006/0256241 | A1 * | 11/2006 | Suzuki et al. | 348/706 |
| 2006/0280055 | A1 * | 12/2006 | Miller et al. | 369/44.11 |
| 2007/0036158 | A1 * | 2/2007 | Hun-Kwon et al. | 370/389 |
| 2007/0070402 | A1 * | 3/2007 | Kitayama et al. | 358/1.15 |
| 2007/0152994 | A1 * | 7/2007 | Koh | 345/211 |
| 2007/0153132 | A1 * | 7/2007 | Jong | 348/705 |
| 2007/0178835 | A1 * | 8/2007 | Sakasegawa | 455/15 |
| 2007/0298656 | A1 * | 12/2007 | He | 439/607 |
| 2008/0005310 | A1 * | 1/2008 | Xu et al. | 709/224 |
| 2008/0007616 | A1 * | 1/2008 | Baladhandayuthapani | 348/14.12 |
| 2008/0068287 | A1 * | 3/2008 | Day et al. | 345/1.2 |
| 2008/0084834 | A1 * | 4/2008 | Stanek | 370/284 |
| 2008/0148063 | A1 * | 6/2008 | Hanko et al. | 713/189 |
| 2009/0234643 | A1 * | 9/2009 | Afifi et al. | 704/201 |
| 2009/0244372 | A1 * | 10/2009 | Petronelli et al. | 348/468 |

* cited by examiner

*Primary Examiner* — Jefferey Harold
*Assistant Examiner* — Humam Satti
(74) *Attorney, Agent, or Firm* — Kokka & Backus, PC (57) ABSTRACT

A multimedia device is described. The multimedia device includes a multiplexer. The multimedia device also includes a plurality of high-definition interface inputs coupled with the multiplexer and an output coupled with the multiplexer. Moreover, the multimedia device includes a processor coupled with the multiplexer to configure the multiplexer to provide one of the plurality of high-definition multimedia interface inputs to the output based on the detection of a clock signal on one of the plurality of high-definition multimedia interface inputs. Furthermore, methods related to embodiments of a multimedia device are described herein.

23 Claims, 5 Drawing Sheets

AUTO-SELECT ALGORITHM FOR A HIGH-DEFINITION MULTIMEDIA INTERFACE SWITCH

Embodiments of the invention relate to multimedia devices. In particular, embodiments of the invention relate to high definition multimedia interface switches.

BACKGROUND

With the advent of digital television transition standards a better means for interconnecting digital multimedia devices such as set top boxes, DVD players, and the like to digital televisions became needed. Digital televisions, such as high-definition televisions, typically produce high quality picture resolutions. For example, high-definition televisions may have resolutions greater than that of televisions conforming to the North American Standard Television System, which has a typical resolution of 720 pixels per 483 lines.

The use of analog connections to connect devices to digital televisions, such as high-definition televisions, introduces losses that can affect picture quality. Furthermore, analog connections require the digital signal to be converted to an analog signal and then back into a digital signal. Digital connections maintain the high quality picture resolutions of digital content and eliminate the need for digital to analog and analog to digital signal conversion.

One digital connection standard that has come to the forefront of digital connections is the high-definition multimedia interface (HDMI). HDMI provides the benefits of an all digital interface that minimizes the number of cables needed for carrying audio and video signals from a source to a monitor, for example. As the number of devices available to connect to a digital monitor, such as a high definition television, increases, there arises a need to have all HDMI devices connected at the same time. This helps avoid removing one source cable to play another source. Examples of HDMI devices may include a digital video disc (DVD) player, a digital video recorder (DVR), a set top box, or video game system. Digital video monitoring devices such as high definition televisions typically have a limited number of HDMI inputs. Typically, a digital video monitoring device has only one or two HDMI inputs. Therefore, if one has more than one or two HDMI sources, the sources must be disconnected and reconnected as use of an HDMI device is used.

One solution to the problem is the use of an HDMI switch. An HDMI switch provides the ability to select from several inputs that is then connected to a single output or multiple outputs that may be connected to an HDMI sink, such as high definition television. Such a switch provides the user the convenience of having many HDMI devices connected to a device that has a limited number of inputs, such as a digital video monitor. One drawback to such a device is that to access one of the multiple sources connected to an HDMI switch the user must manually select the source on the HDMI switch to output that source from the HDMI switch. To select the appropriate source or input device to be outputted on the HDMI switch, the user must know exactly which source is connected to which input. Furthermore, when the HDMI switch is first turned on the user must manually select the input of a device connected to the input that is on in order to deliver that input to the output or outputs of the HDMI switch. As above, this requires the user to know exactly which input source device is connected and to select the input switch on the HDMI switch to have that input source available to the output or outputs of the HDMI switch.

Current HDMI switches that automatically detect a source do so based on availability of a power voltage present on the input, such as the presence of the positive 5 volts power signal. Once the HDMI switch detects the presence of the positive five volt power on the input, the HDMI switch selects that input as the source to be provided to the output or multiple outputs on the HDMI switch. The problem with this automatic selection scheme is that many source devices constantly produce a positive five volts on the input even when no video signal is transmitted. For example, many source devices produce a positive 5 volts power signal when in a standby mode without producing any other signals such as video. Alternatively, some source devices produce a positive 5 volts power signal and a video signal (such as a logo screen) in a standby mode. This leads to the problem of an HDMI switch automatically selecting an input that is not actually producing any valid output, such as a video signal that a viewer would want to watch.

SUMMARY

A multimedia device is described. The multimedia device includes a multiplexer. The multimedia device also includes a plurality of high-definition interface inputs coupled with the multiplexer and an output coupled with the multiplexer. Moreover, the multimedia device includes a processor coupled with the multiplexer to configure the multiplexer to provide one of the plurality of high-definition multimedia interface inputs to the output based on the detection of a clock signal on one of the plurality of high-definition multimedia interface inputs. Furthermore, methods related to embodiments of a multimedia device are described herein.

Other features and advantages of embodiments of the present invention will be apparent from the accompanying drawings and from the detailed description that follows.

BRIEF DESCRIPTION OF THE DRAWINGS

Embodiments of the present invention are illustrated by way of example and not limitation in the figures of the accompanying drawings, in which like references indicate similar elements and in which.

DETAILED DESCRIPTION

Embodiments of a system are described that provide automatic input selection of a high-definition multimedia interface (HDMI) source connected to a multimedia device that contains multiple HDMI input ports as well as a method for implementing automatic selection of an input of a HDMI source connected to a multimedia device having multiple HDMI input ports. In particular, a system is described to automatically select an HDMI input port with a valid video or audio signal from many HDMI source inputs to provide the video or audio signal to a sink, such as a television, without user intervention. The system includes a clock detect circuit to determine if a video or audio signal is present on an input. Once a clock is determined to be present on an input the system automatically selects the source of that input and outputs the source to one output or a plurality of outputs.

Figure 1:
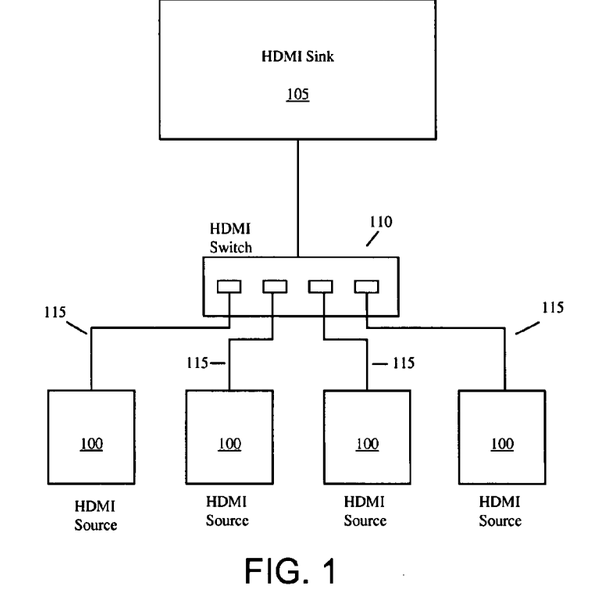
FIG. 1 illustrates an embodiment of a high-definition multimedia interface as part of an entertainment system.

FIG. 1 illustrates an embodiment of an entertainment system using an HDMI switch 110 to connect many HDMI sources 100 to an HDMI sink 105. For the FIG. 1 embodiment the HDMI sink 105 is a digital television monitor such as a high definition television. Embodiments of HDMI sources 100 include digital video disc (DVD) players, digital video recorders (DVR), video game systems, and set top boxes equipped with HDMI interfaces. Because typical HDMI sinks 105 have a limited number of HDMI inputs a device such as an HDMI switch 110 is needed to connect many HDMI sources 100 to an HDMI sink 105 without having to unplug any HDMI sources 110 from an HDMI sink 105 to connect another HDMI source 100. FIG. 1 illustrates an embodiment of an HDMI switch 100 that uses a video clock detect circuit to enable detection of a valid video signal. Once a valid video clock is detected on one of the multiple HDMI inputs, that input is outputted to a video sink 105.

Figure 2:
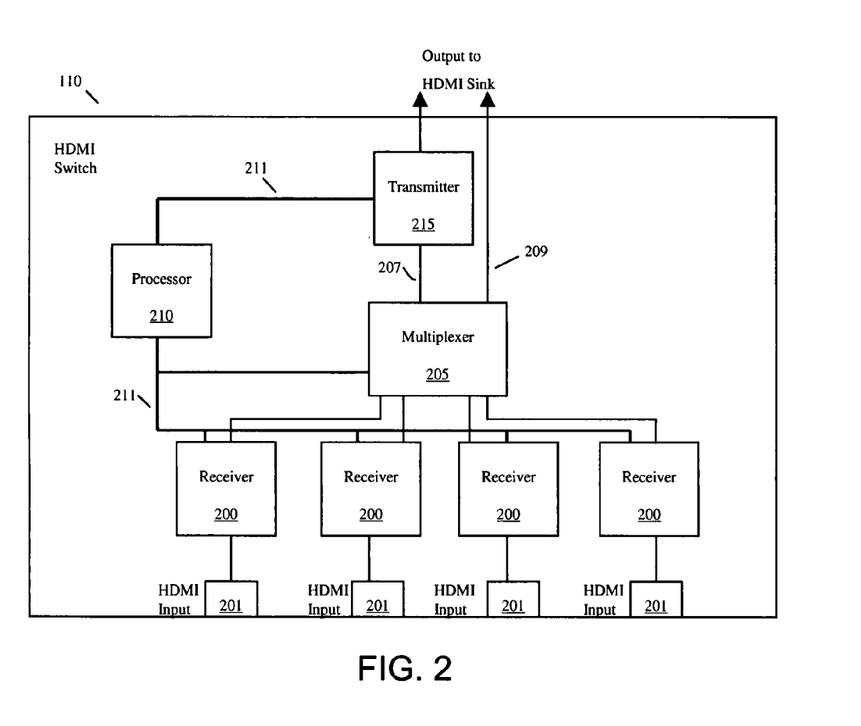
FIG. 2 illustrates an embodiment of a high-definition multimedia interface switch.

An embodiment of a block diagram of an HDMI switch 110 that auto-detects a valid video or audio signal on an input using a clock detect method and automatically switches to that signal is illustrated in FIG. 2. For an embodiment, an HDMI switch 110 may include any number of HDMI inputs 201 connected to an HDMI receiver 200. The FIG. 2 embodiment illustrates four HDMI receivers 200; however, embodiments of an HDMI switch 110 using video clock detection are not so limited. Any number of HDMI inputs 201 or HDMI receivers 200 may be used in accordance to that described herein.

For an embodiment, a number of HDMI receivers 200 are connected to a multiplexer 205. A multiplexer 205 may be implemented as a three-state "virtual" multiplexer by enabling only one of the outputs of a receiver 200 at a time. Another embodiment includes a multiplexer 205 implemented as discrete multiplexer components including digital to analog multiplexer. An embodiment of a multiplexer 205 includes output with a channel for transition minimized differential signaling (TMDS) 207 and a low-speed communications channel 209. The transition minimized differential signaling channel carries audio, video, and auxiliary data as defined by an HDMI standard. For an embodiment, the transition minimized differential signaling channel includes eight signal lines as defined by an HDMI standard to carry audio, video, and auxiliary data. Similarly, the low-speed communications channel includes a number of signals as defined by the HDMI standard. For an embodiment, the low-speed communication channel includes: display data channel (DDC) data signal, and display data channel clock signal, hot plug detect signal, positive 5 volts power, consumer electronics control (CEC), and ground.

For an embodiment, the transition minimized differential signaling channel is fed to a transmitter 215, such as an HDMI transmitter. An embodiment also includes a processor 210, such as a microprocessor or a microcontroller. For an embodiment, a processor 210 is connected to a multiplexer 205, a transmitter 215, and receivers 200 through control signals 211. The control signals 211 may include parallel bus signals, serial bus signals, and any other type of signal. For such an embodiment, the processor 210 uses the multiplexer 205 to select which signals from a receiver 200 are passed through the multiplexer 205. Once a set of transition minimized differential signaling channel and low-speed communications channel are passed through a multiplexer 205, the two channels are connected to a sink 105, such as a digital video monitor. Although one output from an HDMI switch 110 is shown in FIG. 2, embodiments of an HDMI switch 110 may include a plurality of outputs for connecting the output from multiplexer 205 to more than one HDMI sink 105.

Now that the transition minimized differential signaling channel is made available to a sink 105, a clock signal is generated by a source 100 when that HDMI source 100 is generating audio or video signals. If a source 100 is off or is not present, no clock will be present on the transition minimized differential signaling channel. For an embodiment, the clock signal is detected by a receiver 200, which generates a clock detect signal. The clock detect signal is then used by the processor 100 to determine if the transmitter 215 should be enabled, connecting the transition minimized differential signaling channel to a sink 105. Alternatively, a synchronization signal from a receiver 200, such as a sync detect signal, may be used in an embodiment to determine if an HDMI source 100 is generating audio or video signals.

For another embodiment, a switch 110 may include a number of receivers 200 without a clock detect or sync detect signal connected to a multiplexer 205. Similar to an embodiment discussed above, the output from the multiplexer 205 includes a transition minimized differential signaling channel and a low-speed communications channel. The transition minimized differential signaling channel outputted from the multiplexer 205 is connected to a transmitter 215 upon detection of a clock signal on a corresponding transition minimized differential signaling channel of an HDMI input 200. A processor 210 may be connected to the multiplexer 205 and the transmitter 215. The connection to the multiplexer 205 controls which transition minimized differential signaling channel and which low-speed communications channel from one of a number of receivers 200 are outputted from the multiplexer 205. The control signals 211 connected to the transmitter 215 enables the processor 210 to control under what conditions the transmitter 215 provides the transition minimized differential signaling channel to a sink 105. For an embodiment, control signals 211 of a processor 210 are connected to a transmitter 215 and used by the processor 210 to send information to adjust operating characteristics of the transmitter 215.

Figure 3:
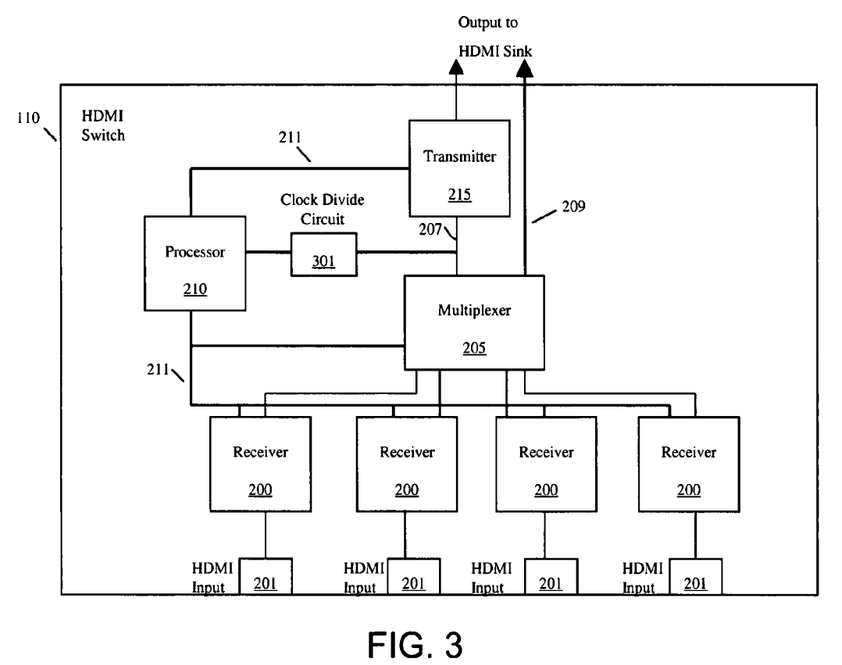
FIG. 3 illustrates an embodiment of a high-definition multimedia interface switch including a clock divide circuit.

Another embodiment of a clock detect method, as illustrated in FIG. 3, includes a processor 210 connection to monitor a clock signal from the transition minimized differential signaling channel in between a multiplexer 205 and a sink 105. The connection to monitor a clock signal from the transition minimized differential signaling channel provides information to processor 210 to determine if a valid video or audio signal is present on a corresponding transition minimized differential signaling channel allowed through multiplexer 205. Upon detection of a clock signal from the transition minimized differential signaling channel, processor 210 may enable transmitter 215 to provide the transition minimized differential signaling channel of a selected receiver 200 to a sink 105.

As illustrated in the FIG. 3 embodiment, a processor 210 connection to monitor a clock signal may include a clock divide circuit. A clock divide circuit 301 may be used to divide a clock signal down to a frequency that is within a range that the processor 210 can detect. An embodiment of a clock divide circuit 301 includes a clock divide circuit 301 external to a processor 210 that uses a clock division ratio of thirty-two. Thus, a clock signal present on a transition minimized differential signaling channel from an HDMI input 201 is divided down by a clock divide circuit 301 before detection by a processor 210. Such embodiments provide the ability to detect high frequency clocks using lower frequency processors. For an embodiment, processor 210 determines a valid audio or video signal is present on a transition minimized differential signaling channel when processor 210 detects a clock signal greater than a certain frequency. One embodiment determines a valid audio or video signal is present when a clock signal is detected that is greater than thirteen megahertz (MHz).

Figure 4:
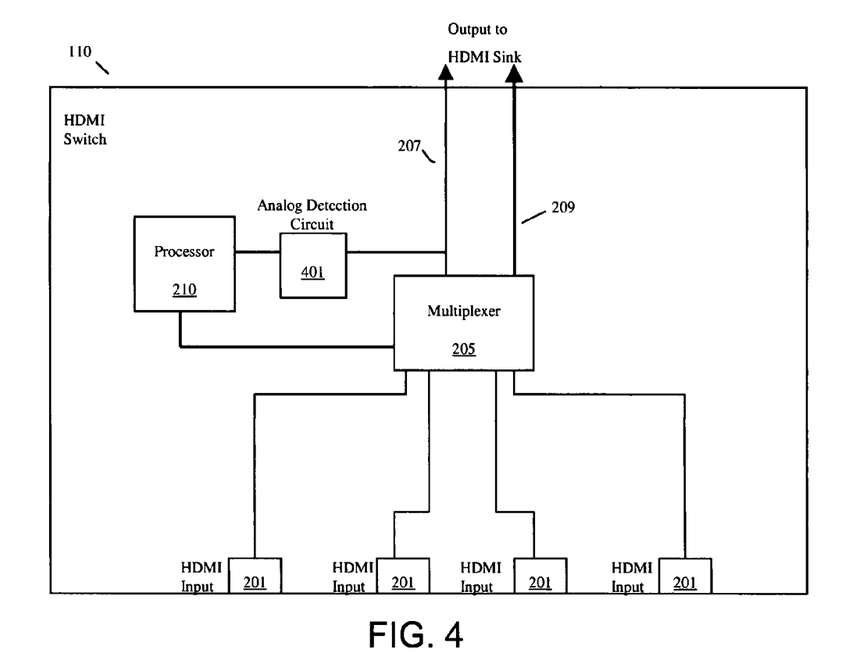
FIG. 4 illustrates an embodiment of a high-definition multimedia interface switch including an analog detection circuit.
Figure 5:
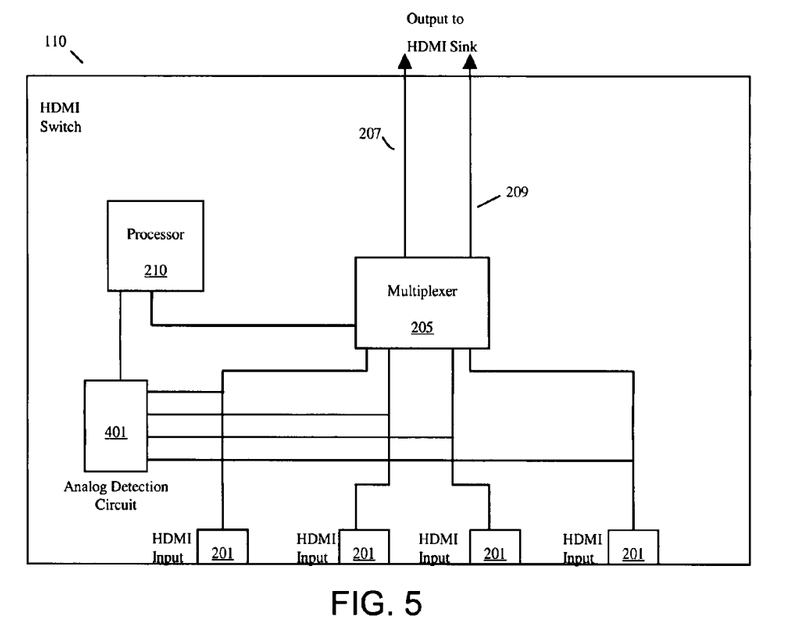
FIG. 5 illustrates an embodiment of a high-definition multimedia interface switch including an analog detection circuit.

Another embodiment includes an analog circuit 401 used to detect the presence of a clock signal, as illustrated in FIG. 4. For the FIG. 4 embodiment, an analog detection circuit 401 is used to provide a signal to processor 210 to indicate that a clock signal is present on a transition minimized differential signaling channel of a selected receiver 200. For example, analog detection circuit 401 may be a low pass filter connected to an analog to digital converter.

For such an embodiment, the clock signal from a transmission minimized differential signaling channel of a selected receiver 200 is fed through a low pass filter to an analog to digital converter. Processor 210 uses the output from the analog to digital converter to determine if a valid audio or video signal is present on the transmission minimized differential signaling channel depending on the output from the analog to digital converter. For example, output values from the analog to digital converter that fit within a range of values representing the maximum or minimum voltage output from the low pass filter over a period of time indicates that no valid audio or video signal is present on the transition minimized differential signaling channel. Conversely, output values from the analog to digital converter that fit within a range of values excluding the range attributed to the maximum or minimum voltage output from the low pass filter indicates the presence of a clock; therefore, a valid audio or video signal is present on the transmission minimized differential signaling channel. An embodiment includes an analog to digital converter implemented as part of processor 210; however, the analog to digital converter may be implemented outside of processor 210.

For an embodiment, an input to an HDMI switch 110 is determined to have a valid audio or video signal present on a transition minimized differential signaling channel using a hot plug method. A hot plug method, for an embodiment, includes using a processor 210 to monitor a low-speed communications channel of an HDMI input 201 and to override the hot plug detect signal on the low-speed communications channel. To implement a hot plug method according to an embodiment, a processor 210 causes a hot plug detect signal to be driven high, for example to a positive 5 volts. Once the input is driven high, processor 210 monitors the display data channel clock signal and the display data channel data signal of a low-speed communications channel for an HDMI source 100 trying to read a memory address of a sink device. An HDMI source typically performs a read to a memory address to obtain the display capabilities of a sink device. One form of storing display capabilities of a sink device is as extended display identification data (EDID).

For an embodiment, processor 210 monitors the display data channel clock signal and the display data channel data signal of the low-speed communications channel of a source attempting to read address 0xA0 on a display data channel of an EDID equipped sink device. If a processor detects an HDMI source 100 trying to read an address containing EDID then the audio and video signals for that input device are enabled to the output or outputs of the switching device. Otherwise, processor 210 monitors the next input to determine if the transition minimized differential signaling channel has a valid audio or video signal present.

Figure 6:
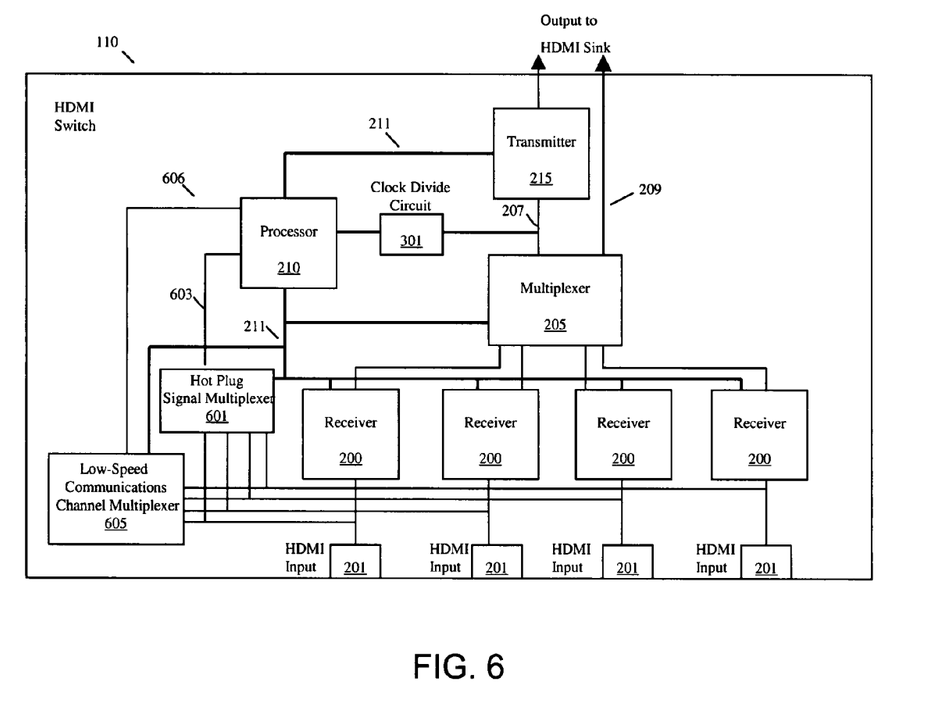
FIG. 6 illustrates an embodiment of a high-definition multimedia interface switch implementing including a hot plug signal multiplexer and a low-speed communications channel multiplexer.

FIG. 6 illustrates an embodiment of an HDMI switch 110 implementing a hot plug method for determining if a valid audio or video signal exists on a transition minimized differential signaling channel. A hot plug signal multiplexer 501 is coupled to a processor 210. For an embodiment, a hot plug signal multiplexer 601 is used to select a HDMI source 110 to drive a voltage on a positive 5 volts signal, such as a PWR5V signal. As illustrated in FIG. 6, positive 5 volts signals from each HDMI input 201 are coupled with a hot plug signal multiplexer 601. For an embodiment, processor 210 selects an HDMI source 100 that will receive the high logic level signal 603 provided to a hot plug detect signal on a low-speed communications channel for the HDMI source 100 selected. Control signals 211 are used for an embodiment to select the output that receives the high logic level signal on a hot plug detect signal of the selected source.

Moreover, a low-speed communications channel multiplexer 605 is coupled with a processor 210, for embodiments similar to that illustrated in FIG. 6. For an embodiment, the output of a low-speed communications channel multiplexer 606 is a low-speed communications channel signal of an HDMI source 100 selected by processor 210. Control signals 211 are used for an embodiment to select the low-speed communications signals for a particular HDMI source 100 to be outputted from low-speed communications channel multiplexer 605. The low-speed communications channel multiplexer 605 provides the ability of a low-speed communications channel of a particular HDMI input 201 to be monitored by microprocessor 210 to determine if an HDMI source 100 connect to an HDMI input 201 is attempting to read an EDID address. Once an HDMI source 100 connected to an HDMI input 201 is determined to have a valid audio or video signal on a transition minimized differential signaling channel, transmitter 215 is enabled to provide the transition minimized differential signaling channel of the HDMI source 100 to the output or outputs of the HDMI switch 110, similar to that discussed previously.

Another embodiment includes monitoring a transition minimized differential channel for a clock signal, as discussed above, and monitoring a low-speed communications channel of an HDMI source 100 for the presence of a positive 5 volts signal. Embodiments monitoring for both a clock signal on a transition minimized differential signaling channel and a positive 5 volts signal on a low-speed communications channel prevents switching off of an HDMI input 201 if a clock signal is interrupted or toggled on and off despite the presence of a video or audio signal on the transition minimized differential signaling channel of that HDMI input 201.

For an embodiment that includes monitoring a transition minimized differential signaling channel for a clock signal and a positive 5 volts signal in a low-speed communications channel to determine if a valid signal is present on a transition minimized differential signaling channel, a priority scheme may be employed giving some inputs a higher priority than others. For an embodiment using a priority scheme where some inputs have a higher priority than others, if a lower priority input is active, higher priority inputs are monitored for an active input. Upon detection of an active input on a higher priority input, a switch according to an embodiment of the present invention switches to the higher priority input. For an embodiment, an HDMI switch 110 determines if a higher priority input has a valid signal present on a transition minimized differential signaling channel by monitoring for a clock signal present on the transition minimized differential signaling channel of any HDMI inputs 201. For an embodiment, lower priority channels are scanned for an active input only after a selected input becomes inactive.

Such a priority scheme is useful for HDMI sources 100 that continue to provide signals such as a positive 5 volts signal in a low-speed communications channel and/or a video signal despite being in a standby mode. Thus, a priority scheme, as discussed above, provides a way to switch from devices that continue to provide signals in a standby mode by connecting these devices to a lower priority input of an HDMI switch 110. The connection to the lower priority input prevents an HDMI switch 110 from continuing to output an HDMI source 100 that is in standby when another HDMI source 100 is producing an active (non-standby) video or audio signal.

Embodiments of an HDMI switch 110 also include using a combination of the techniques discussed above to determine if a valid audio or video signal is present on a transition minimized differential signaling channel. For example, an embodiment may use one method as described above to initially switch to a source but use a second method to determine if a source is still active after a period of time. One embodiment includes using a hot plug method to initially determine an HDMI source 100 has a valid video or audio signal and then using a clock detect method to determine if the video or audio signal is still valid. Therefore, any of the techniques discussed above may be combined in an embodiment of an HDMI switch 110 to determine if a valid video or audio signal is present on a transition minimized differential signaling channel. Furthermore, an embodiment employing a combination technique may be used with a priority scheme similar to the one discussed above.

Figure 7:
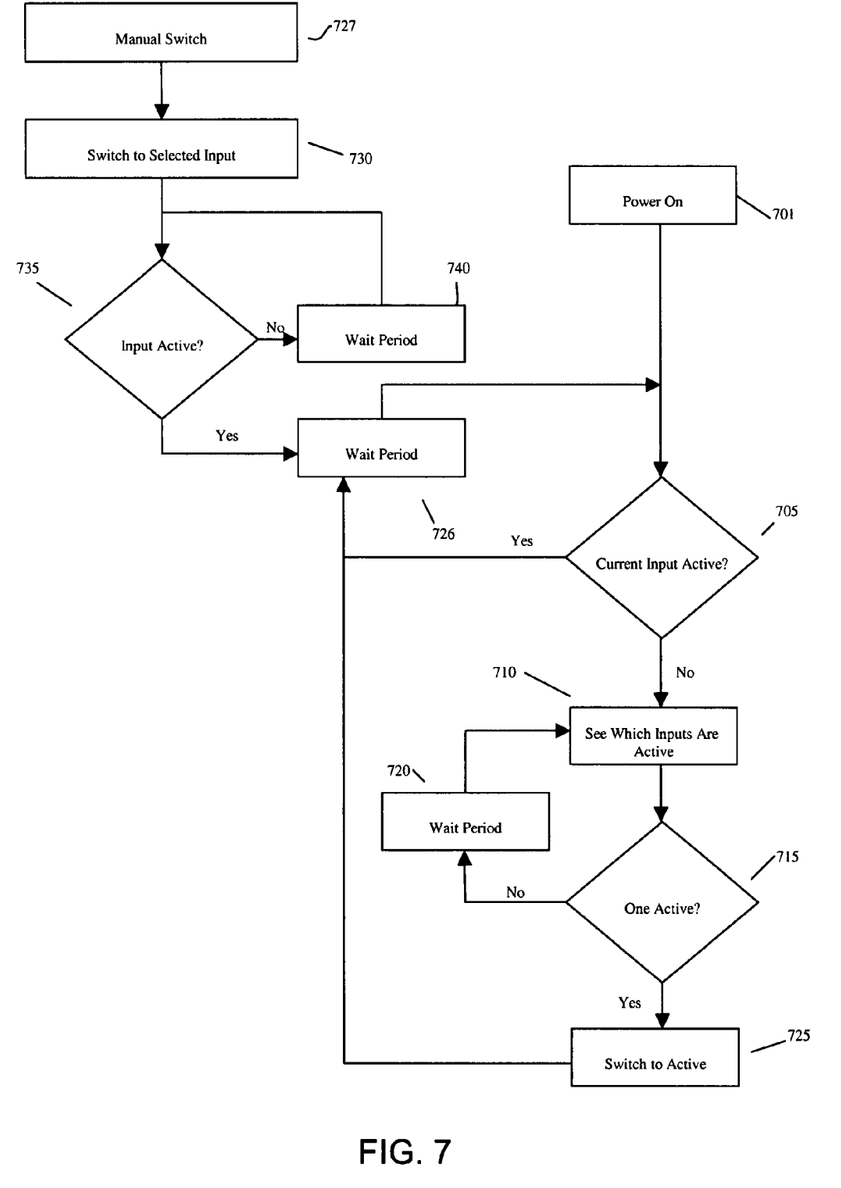
FIG. 7 illustrates a decision flow diagram implemented in an embodiment of a high-definition multimedia interface switch.

FIG. 7 illustrates a flow diagram of an embodiment of an auto-selection algorithm. An embodiment of the flow begins at block 701, once the device switching between sources such as HDMI sources 100 is powered on. At block 705 of the FIG. 7 embodiment, an HDMI source 100 currently selected for outputting a transition minimized differential signal channel is monitored to determine if a clock signal is present on a transition minimized differential signaling channel and therefore active. If at block 705 of the FIG. 7 embodiment the current input is determined not to be active, the flow moves to block 710 to determine which inputs are active. For an embodiment each HDMI source 100 is monitored one at a time to determine if a clock signal is present on a transition minimized differential signaling channel and therefore a valid audio or video signal on the corresponding transition minimized differential signal channel. Another embodiment includes monitoring all HDMI sources 100 at the same time.

At block 715, the determination is made if one of the HDMI sources 100 has an active audio or video signal, as indicated by the presence of a clock signal on the corresponding transition minimized display channel. If an HDMI source 100 is active, the flow at block 725 switches to the active HDMI source 100 by providing the transition minimized differential signal channel of the corresponding active source to the output or outputs of the switching device. Alternately, if the switch device determines that none of the HDMI sources 100 are active, the flow moves to block 720 and waits for a period of time before the flow moves back to block 710 to again determine which HDMI source 100 connected to a switch device is active. For an embodiment the wait period is greater than 10 milliseconds. For one embodiment the wait period is 100 milliseconds.

As illustrated in the FIG. 7 embodiment, once the switch device selects the active HDMI source 100 at block 725 the flow moves to a wait state as indicated by block 726. For an embodiment, the wait state is for a period of time greater than 10 milliseconds. One embodiment includes a wait state period of 100 milliseconds. After waiting the period of time indicated by block 726, the FIG. 7 embodiment moves back to block 705 and the flow continues as discussed above.

Upon receiving a manual switch, the FIG. 7 embodiment begins at block 727 of the flow diagram. An HDMI source 100 manually selected is provided to the output or outputs of a switching device. For an embodiment providing a manually selected HDMI source 100 to an output includes enabling an output of a multiplexer 205 to output the HDMI source 100 from a receiver 200 connected to the HDMI source 100. An embodiment also includes enabling a transmitter 215 to provide the transition minimized differential signal channel to the output or outputs of the switching device. After a manual switch is completed, the flow moves to block 735 and monitors the clock signal for the selected input to determine if the selected input is active. If the selected input is not active the flow moves to block 740 and waits for a period of time before returning to block 735. For an embodiment, the flow waits for a period greater than 10 milliseconds before determining if the selected input is active. Another embodiment waits for 100 milliseconds before returning to block 735. If at block 735 the selected input is determined to be active the flow of the FIG. 6 embodiment proceeds to the wait block 726. Once at block 726, the flow moves back into the loop discussed above.

Figure 8:
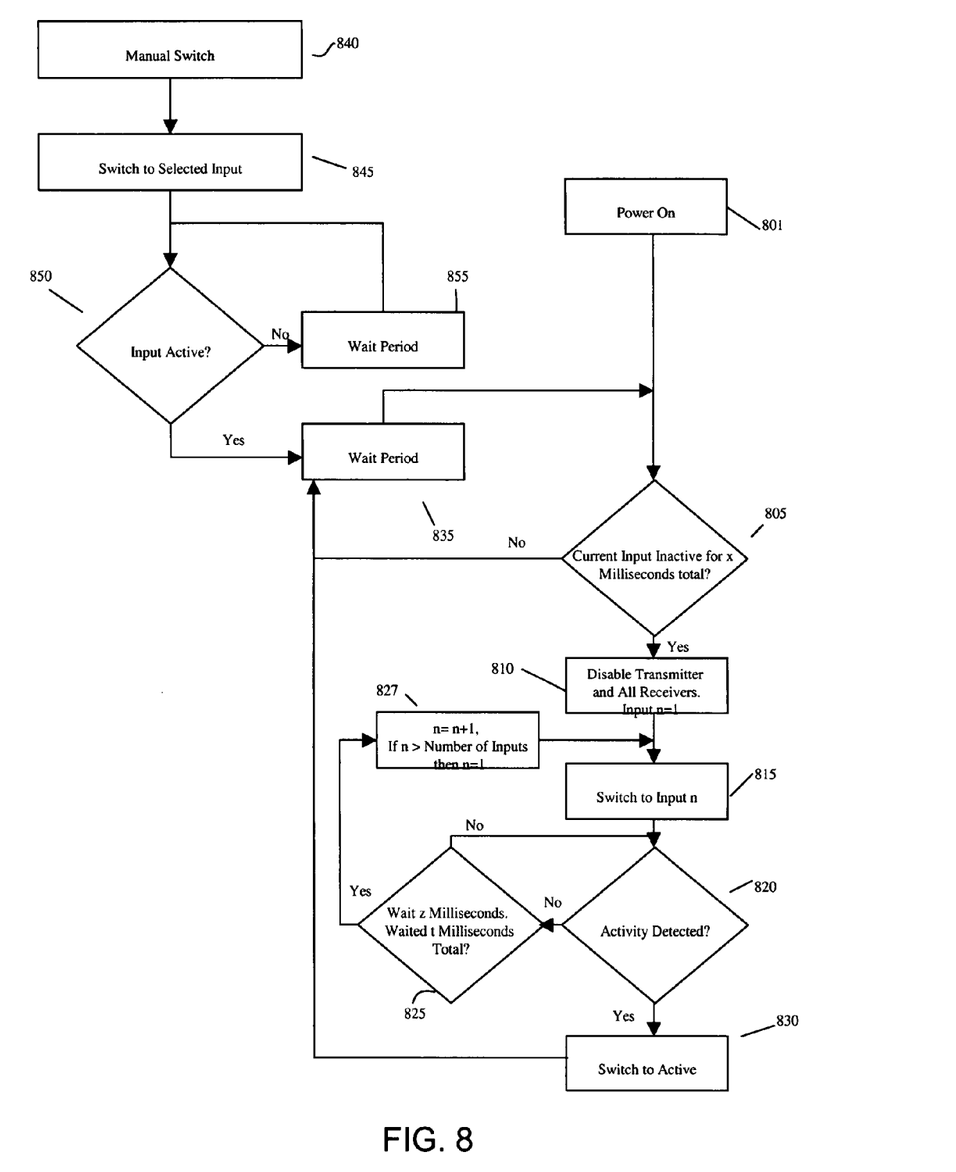
FIG. 8 illustrates a decision flow diagram implemented in an embodiment of a high-definition multimedia interface switch.

Another embodiment of a flow diagram is illustrated in FIG. 8. Similar to the FIG. 7 embodiment, the FIG. 8 embodiment has two main loops: a power on loop and a manual switch loop. The power on loop for the FIG. 8 embodiment begins at block 801 and flows to block 805. At block 805, the transition minimized differential signaling channel is monitored for an HDMI source 100 currently selected by a switch device and once the presence of a clock signal is absent on a transition minimized differential signaling channel of a source for a period of time the flow moves to block 810 to disable a transmitter 215 and disables all the output of the receivers 200. For an embodiment, disabling the output from the receivers 200 is accomplished through disabling any output at the multiplexer 205. Another embodiment includes disabling the outputs of the receivers 200. At block, 810 a variable is set that is used to select an input for monitoring. For an embodiment, the input variable is set to the first receiver at block 810.

With the value of an input variable set, a switch device enables a receiver corresponding to the input variable as illustrated by block 815. As illustrated by block 820, a switch device monitors the transition minimized differential signaling channel for a clock signal. If a clock signal is detected on a transition minimized differential signaling channel for the selected receiver 200 the switch device switches to the active HDMI source 100 at block 830. From block 830, the flow moves to a wait period at block 835 and then reenters the power on loop. For an embodiment the wait period is greater than 10 milliseconds. One embodiment includes a wait period of 100 milliseconds.

If at block 820 no activity is detected, the flow moves to block 825 and waits for a period of time and moves the flow back to block 820 until a maximum of wait periods at block 825 have occurred for a monitored input. For an embodiment the wait time is greater than 10 milliseconds and the maximum wait periods for the input to be monitored is until the total period of time waited is greater than half a second. Another embodiment includes a wait time of 100 milliseconds with the maximum wait period at block 825 for the monitored source not to exceed 1100 milliseconds. Once the maximum wait period at block 825 has been exceeded the flow of the FIG. 8 embodiment moves to block 827.

At block 827, the input variable is incremented such that a new source is monitored to determine if an audio or video signal is present on that sources transition differential minimized signal channel. If at block 827 the input value when incremented would exceed the number of inputs on the switch device, the input variable is set back to the initial value of the input variable. Thus, a switch device would monitor the first input to be monitored. For an embodiment, the first source is initially monitored after power on and the increment equals 1 so that the next input source after the one being monitored will be monitored next. For another embodiment, the initial source monitored is the last source to be monitored before entering the power on loop. Yet another embodiment includes using a round robin scheme to determine the next source to be monitored. One embodiment includes using a decrement to determine the next source to be monitored.

Once the input variable is changed at block 827, the flow of the FIG. 8 embodiment moves to block 815 where the input to a switch device is switched to monitor an input as determined by the input variable. The flow then moves to block 820, as discussed above. If activity is detected at block 820, the flow of the FIG. 8 embodiment moves to block 830 where a switch device enables the active input source at the output(s) of the switch device. At this point, the switch device according to the FIG. 8 embodiment waits for a period of time as represented by block 835 and begins to monitor the activated input at block 805, as discussed above. The flow of the FIG. 8 embodiment continues as discussed above until a manual switch occurs.

Upon a manual switch, the FIG. 8 embodiment enters the manual switch loop at block 840. The flow then proceeds to block 845 where a switch device according to the FIG. 8 embodiment switches to the input selected. For an embodiment switching to the input selected includes selecting the input receiver 200 to be outputted from a multiplexer 205 and enabling a transmitter to provide the transition minimized differential signal channel and the transition minimized differential signaling channel of the selected input source 201. At block 850 of the FIG. 8 flow, the input is monitored to determine if the input is active. If the input is active then the flow enters the power on loop by moving to block 835 to wait for a period of time before determining if the current input is inactive for a period of time at block 805. If the current input is not active the flow moves to block 855. Block 855 represents a wait period in the flow until the flow returns to block 850 to determine if the current input is active. For an embodiment the wait period is greater than 10 milliseconds. Another embodiment includes a wait period of 100 milliseconds.

In the foregoing specification, specific exemplary embodiments of the invention have been described. It will, however, be evident that various modifications and changes may be made thereto. The specification and drawings are, accordingly, to be regarded in an illustrative rather than a restrictive sense.

What is claimed is:

1. A multimedia device comprising:
   a three-state virtual multiplexer configured to switch high-definition multimedia interface ("HDMI") signals received at a plurality of HDMI inputs of said three-state virtual multiplexer;
   a plurality of HDMI receivers, each HDMI receiver having a dedicated HDMI output coupled with one of the plurality of HDMI inputs of said three-state virtual multiplexer, said three-state virtual multiplexer operative to enable only one of the HDMI outputs of one of the plurality of HDMI receivers at a time;
   an HDMI output coupled with said three-state virtual multiplexer; and
   a processor coupled with said three-state virtual multiplexer, said processor configured to monitor said plurality of HDMI inputs to detect a clock signal, and further configured to cause said three-state virtual multiplexer to automatically switch said HDMI output from a first of said plurality of HDMI inputs to a second of said plurality of HDMI inputs if said clock signal is detected on said first of said plurality of HDMI inputs.

2. The multimedia device of claim 1 wherein said three-state virtual multiplexer is coupled with said HDMI output through an HDMI transmitter.

3. The multimedia device of claim 1 wherein said HDMI output is one of a plurality of HDMI outputs.

4. The multimedia device of claim 1 wherein said processor is coupled with said clock signal of one of said plurality of HDMI inputs through a clock divide circuit for detection of a clock signal on one of said plurality HDMI inputs.

5. The multimedia device of claim 1 wherein said processor is coupled with an analog circuit used to detect said clock signal on one of said plurality of HDMI inputs.

6. The multimedia device of claim 1 wherein said processor coupled with said multiplexer to configure said three-state virtual multiplexer to provide one of said plurality of HDMI inputs to said HDMI output based on the detection of said clock signal on one of said plurality of HDMI inputs and detection of a voltage signal present on one of said plurality of HDMI inputs.

7. The multimedia device of claim 2 wherein said processor is coupled with a clock detect signal on each of the HDMI receivers to detect said clock signal on one of said plurality of HDMI inputs.

8. The multimedia device of claim 2 wherein said processor enables said HDMI transmitter based on the detection of said clock signal on one of said plurality of HDMI inputs.

9. A multimedia device comprising:
   a three-state virtual multiplexer configured to switch high-definition multimedia interface ("HDMI") signals received at a plurality of HDMI inputs of said three-state virtual multiplexer;
   a plurality of HDMI receivers, each HDMI receiver having a dedicated HDMI output coupled with one of the plurality of HDMI inputs of said three-state virtual multiplexer, said three-state virtual multiplexer operative to enable only one of the HDMI outputs of one of the plurality of HDMI receivers at a time;
   an HDMI output coupled with said three-state virtual multiplexer; and
   a processor coupled with said three-state virtual multiplexer to monitor said plurality of inputs and configured to automatically select one of said plurality of HDMI inputs to provide to said HDMI output if an attempt to read an address on one of said plurality of HDMI inputs is detected by the processor.

10. The multimedia device of claim 9 wherein said address contains extended display information data.

11. The multimedia device of claim 9 wherein said processor is configured to drive a hot plug detect signal of said plurality of HDMI inputs to a voltage prior to detection of said attempt to read said address on one of said plurality of HDMI inputs.

12. The multimedia device of claim 11 wherein said processor drives said hot plug detect signal of each plurality of HDMI inputs one by one until said processor detects said attempt to read said address on one of said plurality of HDMI inputs.

13. A high-definition multimedia interface switch comprising:
a first high-definition multimedia interface ("HDMI") receiver having a first dedicated HDMI output;
a second HDMI receiver having a second dedicated HDMI output;
an HDMI output;
a three-state virtual multiplexer coupled with the HDMI output, the three-state virtual multiplexer including a first HDMI input coupled with the first dedicated HDMI output, a second HDMI input coupled with the second dedicated HDMI output, the three-state virtual multiplexer operative to switch HDMI signals received at the first and second HDMI inputs, the three-state virtual multiplexer operative to enable only the first dedicated HDMI output or the second dedicated HDMI output at a time;
a processor coupled with said three-state virtual multiplexer to monitor said first HDMI input and said second HDMI input for the presence of a clock signal and to automatically select between said first HDMI input and said second HDMI input to provide to said HDMI output if the presence of said clock signal is detected.

14. The high-definition multimedia interface switch of claim 13 wherein said three-state virtual multiplexer is coupled with said HDMI output through an HDMI transmitter.

15. The high-definition multimedia interface switch of claim 13 wherein said first HDMI input and said second HDMI input include a transition minimized differential signaling channel and a low-speed communications channel.

16. The high-definition multimedia interface switch of claim 15 wherein said processor selects between said first HDMI input and said second HDMI input to provide to said HDMI output based on the presence of said clock signal on said transition minimized differential signaling channel and detection of an attempted read of an extended display identification data address on said low-speed communications channel on an HDMI input.

17. The high-definition multimedia interface switch of claim 15 wherein said processor determines the presence of said clock signal on said transition minimized differential signaling channel through a clock detect signal on said first HDMI receiver or on said second HDMI receiver.

18. The high-definition multimedia interface switch of claim 17 wherein said processor enables said HDMI transmitter upon determining the presence of said clock signal on one of said first or second HDMI inputs to provide said first or second HDMI input with said clock signal present to said HDMI output.

19. A method comprising:
monitoring a high-definition multimedia interface ("HDMI") input to an HDMI switch to detect a clock signal, the HDMI switch comprises a three-state virtual multiplexer, the HDMI input is coupled with a dedicated HDMI output of a HDMI receiver, the three-state virtual multiplexer operative to enable only the dedicated HDMI output of the receiver or another dedicated HDMI output of another receiver at a time;
determining if said HDMI input to said HDMI switch is active by the detection of the presence of said clock signal;
switching automatically to said HDMI input from another HDMI input of said HDMI switch if the presence of said clock signal on said HDMI input is detected; and
outputting said HDMI input to an HDMI output of said HDMI switch.

20. The method of claim 19 wherein determining if said HDMI input to said HDMI switch is active based on the presence of said clock signal includes monitoring for a clock detect signal on said HDMI receiver for said HDMI input.

21. The method of claim 19 wherein providing said HDMI input to said HDMI output of said HDMI switch upon the presence of said clock signal on said HDMI input includes enabling an HDMI transmitter that provides a video signal of said HDMI input to said HDMI output.

22. The method of claim 19 wherein determining if said HDMI input to said HDMI switch is active based on the presence of said clock signal includes selecting a first HDMI input to said HDMI switch from a plurality of HDMI inputs, monitoring for said clock signal on said first HDMI input, and selecting another HDMI input for determining if said HDMI input to said HDMI switch is active based on the presence of said clock signal if no clock signal is present on said first HDMI input.

23. The method of claim 20 further comprising determining if a higher priority HDMI input to said HDMI switch is active based on the presence of said clock detect signal on said HDMI receiver for said higher priority HDMI input.

* * * * *